US008205171B2

(12) United States Patent
Chen et al.

(10) Patent No.: US 8,205,171 B2
(45) Date of Patent: Jun. 19, 2012

(54) SYSTEM AND METHOD FOR PROVIDING GRAPHICAL USER INTERFACE DISPLAYING MULTIPLE VIEWS

(75) Inventors: Chun-Yi Chen, Belmont, CA (US); Aylin Ulysal, Redwood City, CA (US); Sally Baggett, Healdsburg, CA (US); Lulit Bezuayehu, Oakland, CA (US); Prashant Singh, Burlington, MA (US); Peter Budavari, Mill Valley, CA (US); Julian Challenger, Reading (GB)

(73) Assignee: Oracle International Corporation, Redwood Shores, CA (US)

( * ) Notice: Subject to any disclaimer, the term of this patent is extended or adjusted under 35 U.S.C. 154(b) by 459 days.

(21) Appl. No.: 12/563,071

(22) Filed: Sep. 18, 2009

(65) Prior Publication Data
US 2011/0055767 A1 Mar. 3, 2011

Related U.S. Application Data

(60) Provisional application No. 61/239,043, filed on Sep. 1, 2009, provisional application No. 61/239,033, filed on Sep. 1, 2009.

(51) Int. Cl.
*G06F 3/048* (2006.01)
*G06F 3/00* (2006.01)
(52) U.S. Cl. ......... 715/853; 715/854; 715/855; 715/713
(58) Field of Classification Search .................. 715/712, 715/713, 853–855
See application file for complete search history.

(56) References Cited

U.S. PATENT DOCUMENTS

| 5,798,769 A | 8/1998 | Chiu et al. |
| 5,850,221 A | 12/1998 | Macrae et al. |
| 5,937,163 A | 8/1999 | Lee et al. |

(Continued)

FOREIGN PATENT DOCUMENTS
WO WO 2005/084285 A2 9/2005
(Continued)

OTHER PUBLICATIONS

"AA OrgChart Webpart." at URL: http://www.aasoftech.com/Products/OrgChartwebpart/Default.asp, downloaded Nov. 20, 2008; Copyright 1997-2007, AASoftech Inc, 1 page.

(Continued)

*Primary Examiner* — Tadeese Hailu
(74) *Attorney, Agent, or Firm* — Kilpatrick Townsend & Stockton LLP

(57) ABSTRACT

Embodiments of the present invention provide techniques for displaying hierarchy information. In one embodiment, a graphical user interface ("GUI") is provided that displays hierarchy information, the displayed information comprising multiple nodes and hierarchical relationships between the nodes. Different sets of information may be associated with one or more of the displayed nodes. Techniques are provided to enable a user to individually change the set of information displayed in one or more of the displayed nodes. In this manner, a user is able to change the set and/or category of information displayed for one or more selected nodes. More specifically, different sets and/or categories of information contained in the nodes are displayed based on the view selected by the user. In an embodiment, a user is able to choose which nodes need to change the view levels. There are other features in the graphical interface as well.

20 Claims, 13 Drawing Sheets

U.S. PATENT DOCUMENTS

| | | | |
|---|---|---|---|
| 5,953,724 | A | 9/1999 | Lowry |
| 6,128,617 | A | 10/2000 | Lowry |
| 6,154,750 | A | 11/2000 | Roberge et al. |
| 6,259,451 | B1 | 7/2001 | Tesler |
| 6,496,208 | B1 | 12/2002 | Bernhardt et al. |
| 6,732,114 | B1 | 5/2004 | Aamodt et al. |
| 6,859,823 | B1 | 2/2005 | Nishihara et al. |
| 6,944,830 | B2 | 9/2005 | Card et al. |
| 6,990,638 | B2 | 1/2006 | Barksdale et al. |
| 7,080,077 | B2 | 7/2006 | Ramamurthy et al. |
| 7,149,959 | B1 | 12/2006 | Jones et al. |
| 7,363,593 | B1 | 4/2008 | Loyens et al. |
| 7,412,647 | B2 | 8/2008 | Sellers et al. |
| 2003/0218640 | A1 | 11/2003 | Noble-Thomas |
| 2004/0169688 | A1 | 9/2004 | Burdick et al. |
| 2004/0205594 | A1 | 10/2004 | Arora et al. |
| 2005/0071765 | A1 | 3/2005 | Hallisey et al. |
| 2005/0108260 | A1 | 5/2005 | Wenn et al. |
| 2005/0120005 | A1 | 6/2005 | Tesch et al. |
| 2006/0001647 | A1 | 1/2006 | Carroll |
| 2006/0169688 | A1 | 8/2006 | Mori et al. |
| 2007/0011316 | A1 | 1/2007 | Araki et al. |
| 2007/0100848 | A1 | 5/2007 | Vignet |
| 2008/0028338 | A1 | 1/2008 | Kodosky et al. |
| 2008/0162616 | A1 | 7/2008 | Gross et al. |

FOREIGN PATENT DOCUMENTS

| | | | |
|---|---|---|---|
| WO | WO 2007/111951 | A2 | 10/2007 |
| WO | WO 2008/042677 | A2 | 10/2008 |

OTHER PUBLICATIONS

"Chapter 2: A Tutorial Introduction to Leo," at URL: http://webpages.charter.net.edramleo/intro.html#clones-views, downloaded Nov. 17, 2008, 4 pages.

U.S. Appl. No. 12/490,250, filed Jun. 23, 2009, Chen et al.
U.S. Appl. No. 12/492,084, filed Jun. 23, 2009, Chen et al.
U.S. Appl. No. 12/563,069, filed Sep. 18, 2009, Chen et al.
U.S. Appl. No. 12/563,075, filed Sep. 18, 2009, Chen et al.
U.S. Appl. No. 12/563,082, filed Sep. 18, 2009, Chen et al.
U.S. Appl. No. 12/563,085, filed Sep. 18, 2009, Chen et al.

"Create multiple Views with on one node with paging," Jan. 5, 2008, at URL: http://drupal.org/node/85720, downloaded Nov. 17, 2008, 3 pages.

"Different Context Menus depending on selected Node in Tree View-Xtreme Visual Basic Talk," at URL: http://www.xtremevbtalk.com/showthread.php?t=85288, downloaded Nov. 18, 2008, 3 pages.

Dill et al., "A Continuously Variable Zoom for Navigating Large Hierarchical Networks," at URL: http://ieeexplore.ieee.org/Xplore/login.jsp?url=/iel2/3184/9019/00399869.pdf?temp=x, 1994, 5 pages.

"Discussion Forum: Ittoolbox Groups Regarding to organization chart in asp.net" at URL: http://c.ittoolbox.com/groups/technical-functional/csharp-1/regarding-to-organization-chart-in-aspnet-2191857, downloaded Nov. 20, 2008, Copyright 1998-2008, CEB Toolbox, Inc., 2 pages.

"Global View Mode," http://www.ilog.com/documentation/elixir10/en-US/Content/Visualization/Documentation/Elixir/_pubskel/ps_elixir82.html, downloaded Nov. 20, 2008; Copyright 1987-2008, ILOG S.A, 3 pages.

"Google Organizational Charts," Cogmap, at URL: http://www.cogmap.com/chart/google, downloaded Nov. 13, 2008, 5 pages.

"How to Draw Organizational Charts," EDrawsoft, at URL: http://www.edrawsoft.com/How-to-draw-org-charts.php, Copyright 2004-2008, EDrawSoft downloaded Nov. 13, 2008, 2 pages.

"Grouping Data in a Report" at URL: http://msdn.microsoft.com/en-us/library/ms155903(SQL.90).aspx, downloaded Nov. 20, 2008, Copyright 2008, Microsoft Corporation, 2 pages.

"INAPORT Enterprise Data Integration for GoldMine," at URL: http://www.databridgenow.com/what_we_do/inaport.pdf, InaPlex Limited 2002, 6 pages.

"InfoPath Team Blog: recursive Controls support in Infopath," 2003 SP1 at URL: http://blogs.msdn.com/infopath/archive/2004/06/24/164988.aspx;copy, downloaded Dec. 15, 2008, Copyright 2008, Microsoft Corporation, 4 pages.

"Integrated Multi-Views," Journal of Visual Languages & Computing, Abstract, Jun. 1998, vol. 9, Issue 3, at URL: http://www.sciencedirect.com/science?_ob=ArticleURL&_udi=B6WMM-45J5BMS-P&_user=10&rdoc=1&_fmt=&orig=search&_sort=d&view=c&_acct=C000050221&_version=1&_urlVersion=0&_userid=10&md5=b16ea573128ea20191cc62fa49df0c46, Copyright 1998, Academic Press, 2 pages.

"JSF portlet with JWL Data Tree Component," at URL: http://www.ibm.com/developerworks/forums/thread.jspa?threadID=161906, downloaded Nov. 18, 2008, 4 pages.

"KNIME Quick Start Guide," at URL: http://www.knime.org/quickstartguide.html, downloaded Nov. 17, 2008; Copyright 2003-2008, University of Konstanz, Germany,10 pages.

"KWizCom Organization Chart web part Installation & User Guide" Copyright 2005, KWizCom Ltd, pp. 1-22.

"McGill Organizational Chart" McGill Organizational Chart Manual—Version 2 Aug. 2005; 11 pages.

Nation et al., "Browse Hierarchical Data with the Degree of Interest Tree," at URL: http://www2.parc.com/istl/groups/uir/publications/items/UIR-2002-12-Nation-CHI2002-DOIDemo.pdf, downloaded 2008, 2 pages.

"Organization Chart," at URL: http://www.aasoftech.com/Demo1/3LevelChart.htm, downloaded Feb. 2, 201; 1 page.

"Organization charts from Office 2000 programs appear different in Office XP programs," at URL: http://support.microsoft.com/kb/293615, downloaded Nov. 20, 2008; Copyright 2008, Microsoft, 4 pages.

"Organization Chart" http://www.12manage.com/methods_organization_chart.html, downloaded Nov. 20, 2008, Copyright 2008 12manage, 3 pages.

"Organization Chart," at URL: http://www.longbowcg.com/home/services/downloads/coursewarevol2pdf.pdf, downloaded on or before Oct. 2010, 5 pages.

"OrgPlus Professional Tour: 7—Automatically format charts based on the data they contain" at URL: http://www.orgplus.com/products/orgplus-professional/orgplus-professional-tour.htm#, downloaded Nov. 17, 2008, 2000-2008, Copyright HumanConcepts. 1 page.

"OrgPlus Professional Tour: 6. Show chart data in multiple views" at URL:http://www.orgplus.com/products/orgplus-professional/orgplus-professional-tour.htm#, downloaded Nov. 20, 2008, Copyright 2000-2008, HumanConcepts, 1 page.

OrgPlus Professional Tour 5. Create multiple customized chart views to present employee data differently, at URL:http://www.orgplus.com/products/orgplus-professional/orgplus-professional-tour.htm#, downloaded Nov. 20, 2008, 2000-2008, Copyright HumanConcepts, 2 pages.

"Org Chart Test" at URL: http://sandpit.reitsma.net.au/googleOrg/OrgChartTest.html; downloaded Dec. 15, 2008, 1 page.

Perkins, "Create and organizational chart with HTML, VML, and XML," downloaded Dec. 15, 200, 3 pages.

"1. Portal Tour—Chapter 2. User Guide," at URL: http://www.polarion.com/products/alm/help/ug_quicktour.html, downloaded Nov. 20, 2008; 9 pages.

Plumlee et al.,"Zooming, Multiple Windows, and Visual Working Memory," at URL: http://ccom.unh.edu/vislab/PDFs/Zoom_Multi_VisualWM_final.pdf, 2008; 10 pages.

"Quixa Organisation Chart," at URL: http://www.quixa.com/bpmsuite/orgchart.asp, downloaded Nov. 20, 2008; Copyright 2008, Qiuxa Solutions, 1 page.

"QMF_V8-DB2 QMF Visionary Developer's Guide—Organization chart example," http://publib.boulder.ibm.com/infocenter/dzichelp/v2r2/index.jsp?topic=/com.ibm.qmf.doc.visd.dsqvdmst50.htm, downloaded Nov. 13, 2008, Copyright 1982, 2004, IBM Corporation; 3 pages.

"Readerware views," at URL: http://www.readerware.com/help/rwViews.html, downloaded Nov. 20, 2008; Copyright 1999-2008, Readerware Corporation, 3 pages.

"Sage Abra OrgPlus Professional" Copyright 2007, Sage Software, 2 pages.

"Support Organization Chart" at URL: http://resources2.visual-paradigm.com/index.php/release-vp33/55-vp33/91-org-chart.pdf, Last updated Aug. 11, 2008, 5 pages.

Schaffer et al., at URL: "Navigating Hierarchically Clustered Networks Through Fisheye and Full-Zoom Methods," Fisheye versus Full Zoom Views, Mar. 24, 1998, pp. 1-20.

Stolte et al., "Multiscale Visualization Using Data Cubes," at URL: http://graphics.stanford.edu/papers/pan_zoom/paper.pdf, downloaded 2008, 8 pages.

TreeTable—Java applet combines grid and tree view, at URL: http://www.advancescripts.com/detailed/3201.html, downloaded Nov. 20, 2008; Copyright 2006, AdvanceScripts™, 2 pages.

"TreeView Nodes and ContextMenuStrip" at URL:http://www.devnewsgroups.net/group/microsoft.public.dotnet.framework.windowsforms/topic53850.aspx, downloaded Nov. 18, 2008, 5 pages.

"The Most Trusted Name in Enterprise Organizational Charting and Reporting," OrgPublisher, at URL:http://www.ilog.com/documentation/elixir10/enUS/Content/Visualization/Documentation/Elixir/_pubskel/ps_elixir82.html, downloaded Nov. 20, 2008, 2 pages.

"Understanding Data Graph Window Areas," at URL:http://docs.hp.com/en/B6454-97413/ch08s02.html, downloaded Nov. 18, 2008; Hewlett-Packard Development Company 2000, L.P, 3 pages.

"Welcome to Defura Infotech! Dynamic Org chart and Form Designer Tools," at URL: http://jayankv.com/OrgChartDetails.aspx, downloaded Nov. 13, 2008, Copyright 2007, Defure Infotech, 3 pages.

Zhao et al., "Elastic Hierarchies: Combining Treemaps and Node-Link Diagrams," at URL: http://www.dgp.toronto.edu/~sszhao/paperInforVis05_ElasticHierarchy.pdf, downloaded 2008, 8 pages.

SYSTEM AND METHOD FOR PROVIDING GRAPHICAL USER INTERFACE DISPLAYING MULTIPLE VIEWS

CROSS-REFERENCES TO RELATED APPLICATIONS

The present application claims the benefit and priority under 35 U.S.C. 119(e) from the following U.S. Provisional Applications, the entire contents of which are herein incorporated by reference for all purposes:

(1) U.S. Provisional Application No. 61/239,033, filed Sep. 1, 2009, entitled SYSTEM AND METHOD FOR PROVIDING GRAPHICAL USER INTERFACE DISPLAYING MULTIPLE VIEWS;

(2) U.S. Provisional Application No. 61/239,043, filed Sep. 1, 2009, entitled METHOD AND SYSTEM FOR PROVIDING USER INTERFACE REPRESENTING ORGANIZATION HIERARCHY;

The present application also incorporates by reference for all purposes the entire contents of U.S. application Ser. No. 12/563,069 filed Sep. 18, 2009, entitled METHOD AND SYSTEM FOR PROVIDING USER INTERFACE REPRESENTING ORGANIZATION HIERARCHY.

BACKGROUND OF THE INVENTION

The present invention is directed to a method and system for providing user interface representing organization hierarchy that offers multiple view for nodes displayed on a hierarchical chart.

In an information age, more and more data is being collected and stored every second. Satellites orbiting the earth record information and photographs of our planet everyday, and they send this information and photographs back to earth. Millions of computers on the Internet collect all types of information, ranging from network usage to marketing data. All types of organizations, large and small, store information such as personnel data, operational costs, etc. New tools are invented to make collecting data easier, faster, and more convenient than ever before.

Data, no matter how it is collected, is only meaningful and useful to people when organized and stored logically. For example, computers often rely on data structure to store data in predefined fields. For large amounts of data, people usually rely on databases, where structured collection data and/or records are stored in computer systems in accordance to predefined rules and/or database models.

Relationship models, hierarchical models, and network models, are commonly used database models for representing relationships among records. Typically, databases rely on database software to organize and manage the data and/or records. For example, database software organizes and stores data and/or records using various types of database models.

Graphical user interface ("GUI") is a helpful tool for displaying data and showing the relationships thereof. Numerous conventional graphical interfaces are capable of displaying records from a database in a hierarchical view. Unfortunately, conventional GUIs are often inadequate for displaying some types of information that a user might need to see.

Therefore, a new and improved graphical user interface is desired.

BRIEF SUMMARY OF THE INVENTION

Embodiments of the present invention provide techniques for displaying hierarchy information. In one embodiment, a graphical user interface ("GUI") is provided that displays hierarchy information, the displayed information comprising multiple nodes and hierarchical relationships between the nodes. Different sets of information may be associated with one or more of the displayed nodes. Techniques are provided to enable a user to individually change the set of information displayed in one or more of the displayed nodes. In this manner, a user is able to change the set and/or category of information displayed for one or more selected nodes. More specifically, different sets and/or categories of information contained in the nodes are displayed based on the view selected by the user. In an embodiment, a user is able to choose which nodes need to change the view levels. There are other features in the graphical interface as well.

According to an embodiment, the present invention provides a computer-readable medium in a computer system having a processor, a graphical user interface including a display and a user interface device communicatively coupled to the processor. The processor is configured to execute codes stored in a computer readable medium for operating the user interface device. The computer readable medium includes codes for obtaining information representing a plurality of entities and relationship data associated with the plurality of entities, the plurality of entities and the relationship data associated with the plurality of entities being stored in a memory, each of the plurality of entities including data being associated with a plurality of categories, the plurality of categories including a first category and a second category, the plurality of entities including a first entity and a second entity, the first entity including a first data set associated with the first category and a second data set associated with the second category, the second entity including a third data set associated with the first category and a fourth data set associated with the second category. The computer readable medium also includes codes for defining a menu region and a display region within the graphical user interface, the menu region including a global selection menu, the global selection menu including selections for the first category and the second category. The computer readable medium further includes codes for displaying the plurality of entities within the display region, the plurality of entities being displayed as nodes of a hierarchical chart based on at least the relationship data, each of the nodes displaying a default data set, each of the nodes including a selection menu, the first entity including a first selection menu, the second entity including a second selection menu. The computer readable medium further includes codes for receiving a first user input by the user interface device. The computer readable medium further includes codes for processing the first user input. The computer readable medium further includes codes for updating data displayed on one or more nodes based on the user input. Each of the plurality of nodes displays information associated with the first category, if the first category is selected at the global selection menu. If the first category from the first selection menu is selected, a first node corresponding to the first entity displays information from the first data set and information displayed at a second node associated corresponding to the second entity is unaffected by the user input.

According to another embodiment, the present invention provides a system for providing graphical user interface. The system includes a processor for obtaining information for a plurality of entities from a memory, relationship data associated with the plurality of entities being stored in the memory, each of the plurality of entities including data being associated with a plurality of categories, the plurality of categories including a first category and a second category, the plurality of entities including a first entity and a second entity, the first entity including a first data set associated with the first category and a second data set associated with the second category, the second entity including a third data set associated with the first category and a fourth data set associated with the second category. The system also includes a user input device for receiving one or more user inputs. The system further includes a display for displaying a menu region and a display region within the graphical user interface, the menu region including a global selection menu, the global selection menu including selections for the first category and the second category, the display being configured for displaying the plurality of entities within the display region, the plurality of entities being displayed as nodes of a hierarchical chart based on at least the relationship data, each of the nodes displaying a default data set, each of nodes including a selection menu, the first entity including a first selection menu, the second entity including a second selection menu. The system includes a memory for storing category states for each of the nodes. Each of the plurality of nodes displays information associated with the first category, if the first category is selected at the global selection menu. If the first category from the first selection menu is selected, a first node corresponding to the first entity displays information from the first data set and information displayed at a second node corresponding to the second entity is unaffected by the user input.

According to yet another embodiment, the present invention provides a computer readable medium for providing a graphical user interface, the computer readable medium having codes executable by processor. The computer readable medium includes code for obtaining information for a plurality of entities and relationship data associated with the plurality of entities, the information for the plurality of entities and the relationship data associated with the plurality of entities being stored in a memory, each of the plurality of entities including data being associated with a plurality of categories, the plurality of categories including a first category and a second category, the plurality of entities including a first entity and a second entity, the first entity including a first data set associated with the first category and a second data set associated with the second category, the second entity including a third data set associated with the first category and a fourth data set associated with the second category. The computer readable medium includes code for defining a menu region and a display region within the graphical user interface, the menu region including a global selection menu, the global selection menu including selections for the first category and the second category. The computer readable medium includes code for displaying the plurality of entities within the display region, the plurality of entities being displayed as nodes of a hierarchical chart based on at least the relationship data, each of the nodes displaying a default data set, each of nodes including a selection menu, the first entity including a first selection menu, the second entity including a second selection menu. The computer readable medium includes code for processing a first user input by the user interface device. The computer readable medium includes code for updating data displayed on one or more nodes based on the user input. The computer readable medium includes code for causing each of the plurality of nodes to display information associated with the first category, if the first category is selected at the global selection menu. The computer readable medium includes code for causing the first node to display information associated with the second data set, if a first node is selected to display information associated with the second category, while a third node displays information associated with the third data set, the first node corresponding to the first entity.

DETAILED DESCRIPTION OF THE INVENTION

Embodiments of the present invention provide techniques for displaying hierarchy information. In one embodiment, a graphical user interface ("GUI") is provided that displays hierarchy information, the displayed information comprising multiple nodes and hierarchical relationships between the nodes. Different sets of information may be associated with one or more of the displayed nodes. Techniques are provided to enable a user to individually change the set of information displayed in one or more of the displayed nodes. In this manner, a user is able to change the set and/or category of information displayed for one or more selected nodes. More specifically, different sets and/or categories of information contained in the nodes are displayed based on the view selected by the user. In an embodiment, a user is able to choose which nodes need to change the view levels. There are other features in the graphical interface as well.

Figure 1:
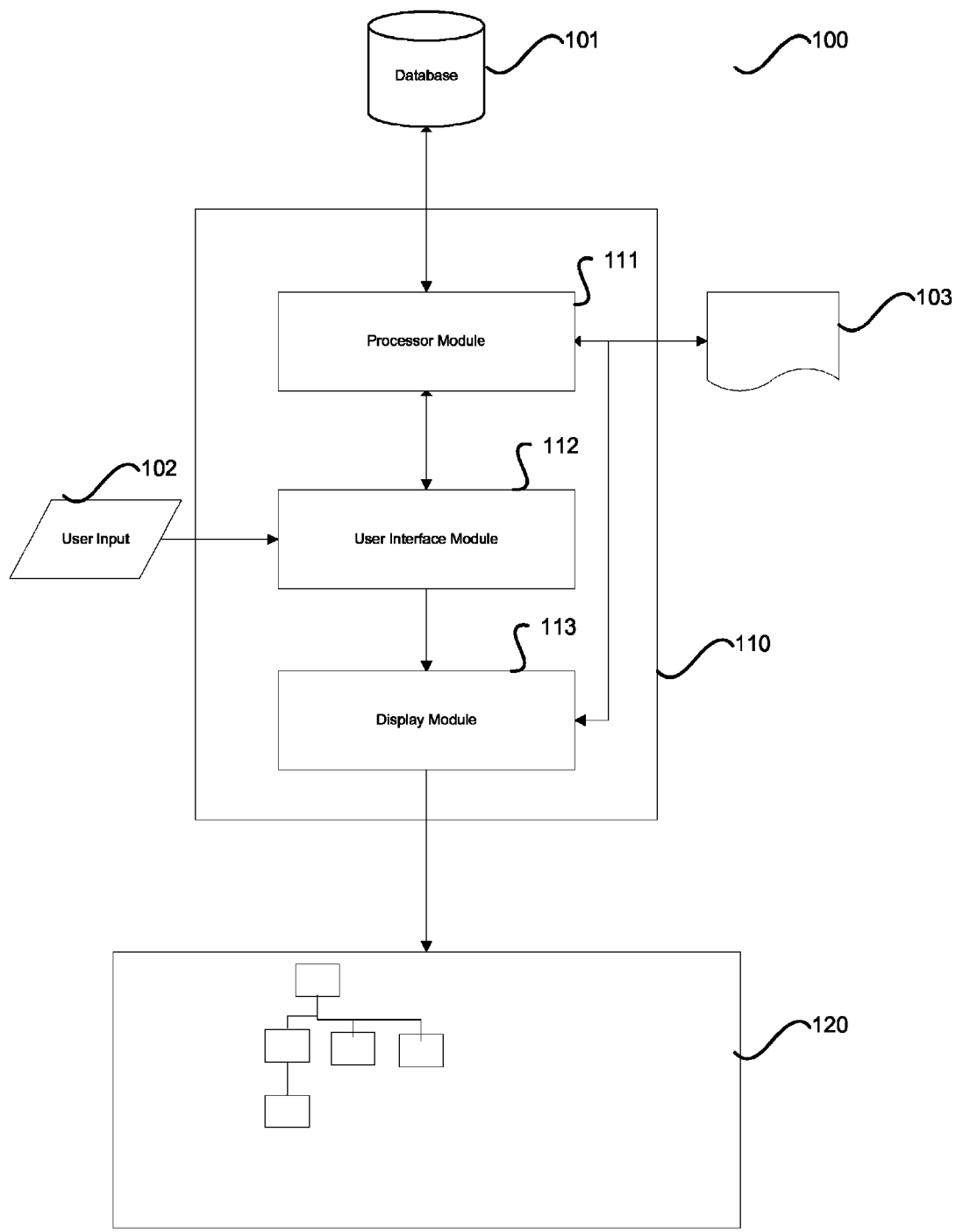
FIG. 1 is a simplified diagram illustrating data flow for processes according to embodiments of the present invention.

FIG. 1 is a simplified diagram illustrating data flow for processes according to embodiments of the present invention. This diagram is merely an example, which should not unduly limit the scope of the claims. One of ordinary skill in the art would recognize many variations, alternatives, and modifications.

As shown in FIG. 1, a system 100 the following components:

1. a database 101;
2. a processor module 111;
3. a user interface module 112;
4. a rendering module 113; and
5. a display 120.

As an example, the processor module 111, the user interface module 112, and the rendering module 113 are parts of a controller module 110.

The database 101 is connected to the controller module 110. Depending on the application, the database 101 may implemented as structured data stored on a local memory device, such as hard disk, flash memory, etc. In one embodiment, the database 101 is stored at a network location.

Among other features, the database 101 stores data that represents various entities that are related to one another. The database 101 stores relationship data representing the relationship among these entities. Each of these entities is associated with one or more sets (e.g., category) of information. In certain embodiments, each set of information is associated with a predefined view. For example, an entity in the database 101 represents a manager in a personnel database, and the manager has attributes that include name, address, salary, title, etc. The name display is associated with view 1, address display is associated with view 2, and so on.

The processor module 111 is configured to obtain information from the database 101. For example, the processor module 111 retrieves both entity data and relationship data mentioned above and processes this data. In various embodiments, the processor module 111 determines category and/or view information for each of the entities in the database and stores the view information using the status indicator 103. In one embodiment, the status indicator 103 stores (1) what categories and/or views are available for each entity; and (2) which of the views is to be displayed for each of the entities.

Once the processor module 111 processes the information from the database 101, the processor module 111 generates a hierarchical chart that is to be displayed on display 120. As shown in FIG. 1, processor module 111 sends the hierarchical chart to the rendering module 113 for rendering on the display 120. As shown in FIG. 1, the display 120 is used to display the hierarchical chart. For example, the hierarchical chart includes a number of nodes and links. Each of the nodes represents an entity and/or concept that is stored in the database. The links among the nodes represent the relationship among the nodes. When the hierarchical chart is displayed, the information that is to be displayed for each node is based on the level information stored in the status indicator 103. For example, if the status indicator 103 indicates that view 1 information is to be displayed, the processor module 111 provides names of personnel in the hierarchical chart for display; if the status indicator 103 indicates that view 2 information is to be displayed, the processor module 111 provides addresses of personnel in the hierarchical chart for display. In an embodiment, the status indicator 103 comprises a memory.

The controller module 110 as shown includes a user interface module 112 for receiving user input. When user input 102 is received, the display 120 updates accordingly. For example, when user input 102 indicates that the view should be changed, the user input is received by the user interface module 112 and processed by the processor module 111. The processor module 111 updates the view information stored in the status indicator 103, and retrieves additional information from the database if necessary. The processor module 111 then generates an updated hierarchical chart, with one or more nodes changing the level of information that is to be displayed. The updated hierarchical chart is then rendered by the rendering module 113 and then displayed at the display 120.

Depending on the operational mode, the change of view for the nodes may work in different ways. In one exemplary scenario, the view for each node on the hierarchical chart is changed and synchronized to one specific view, if a view selection is made at a global menu and all of the nodes are selected for view change. On the other hand, if a user selected one or more nodes of the hierarchy, only the selected nodes change their view. The detailed operation of displaying and updating the hierarchical chart is described in more detail below.

Figure 2A:
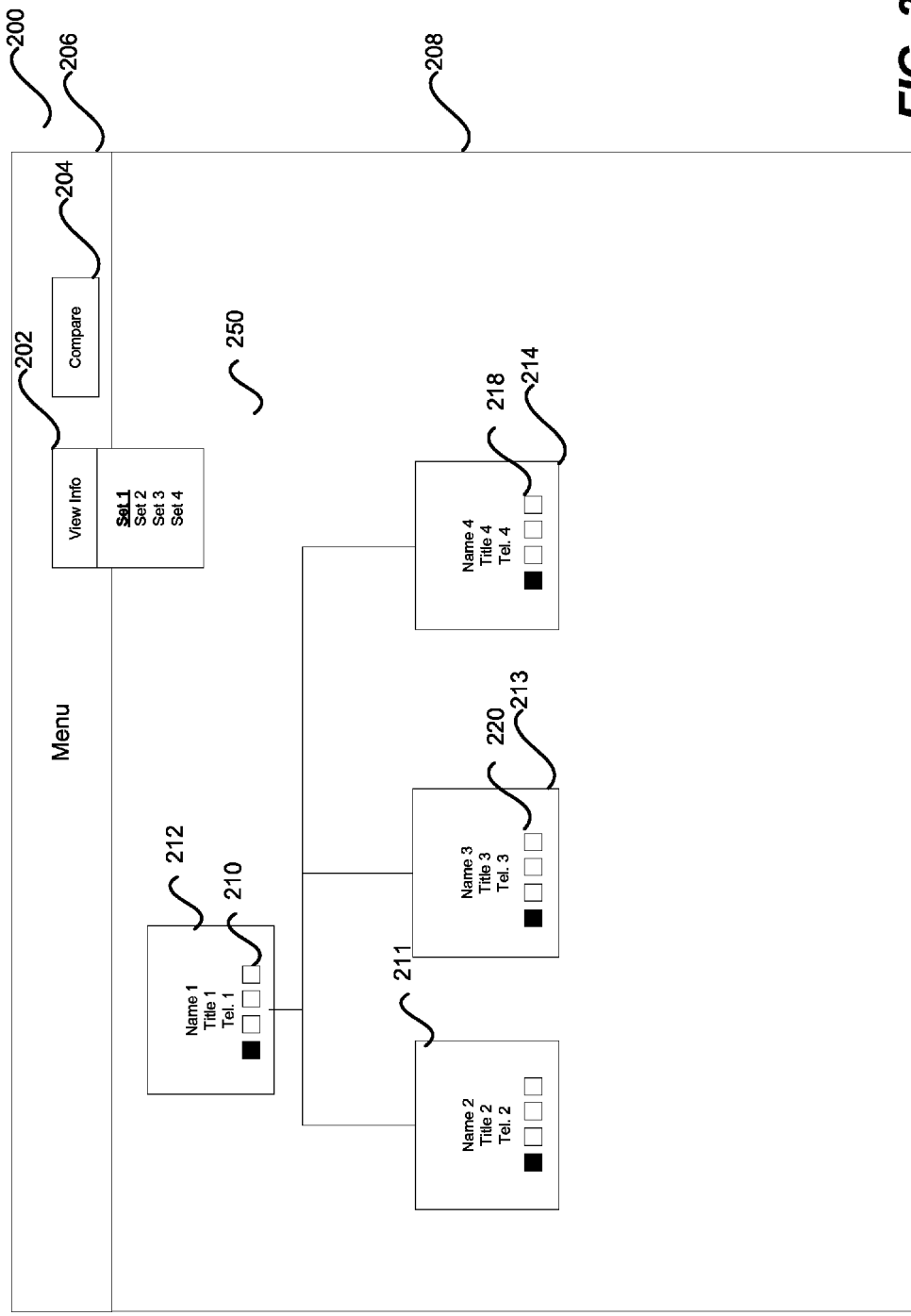
FIGS. 2A and 2B are simplified diagrams illustrating a graphical user interface according to embodiments of the present invention.
Figure 2B:
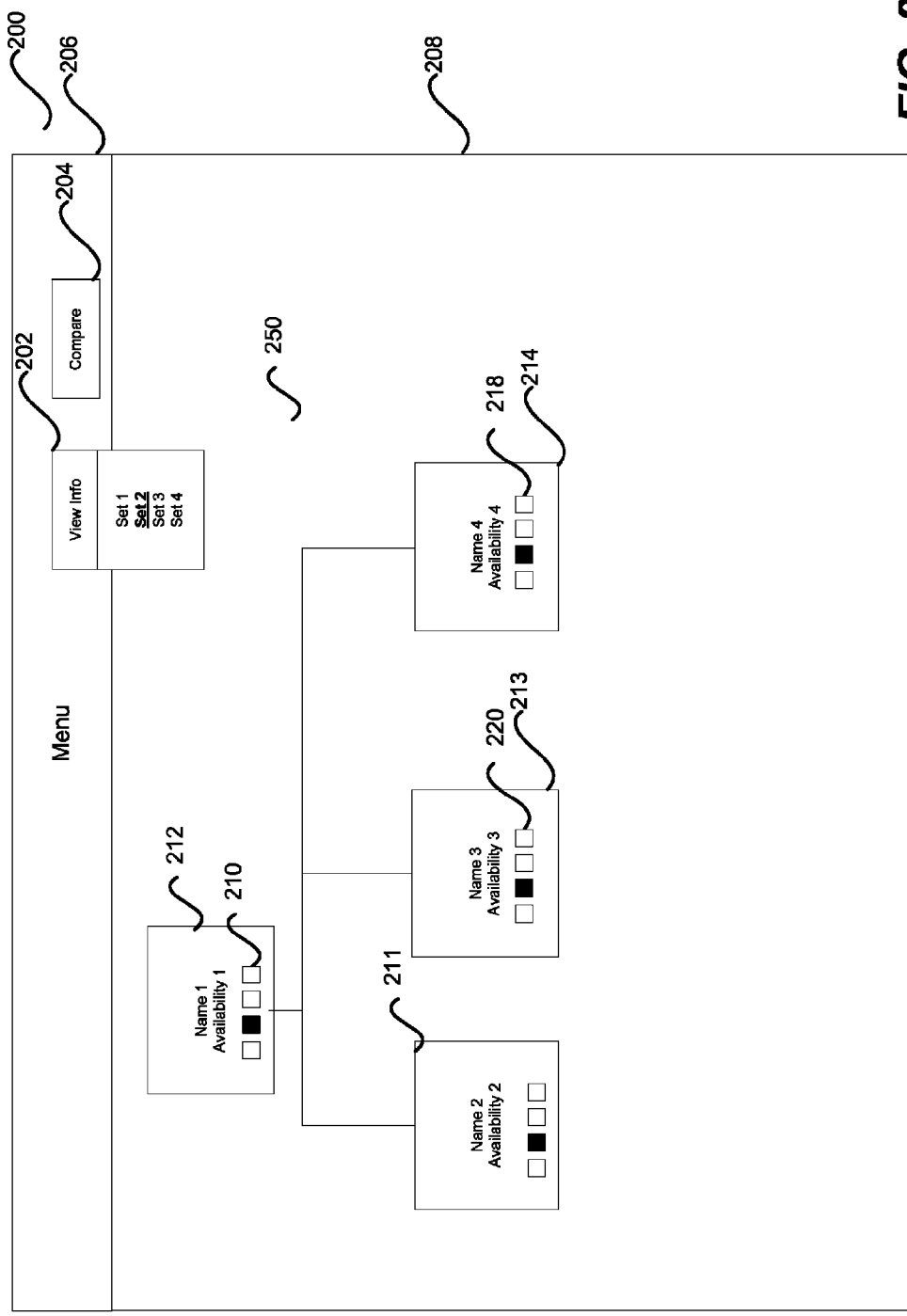

FIGS. 2A and 2B are simplified diagrams illustrating a graphical user interface according to embodiments of the present invention. These diagrams are merely an example, which should not unduly limit the scope of the claims. One of ordinary skill in the art would recognize many variations, alternatives, and modifications.

A graphical user interface ("GUI") 200 is shown in FIG. 2A. The GUI 200 contains a display region 208, a menu region 206, and a view control region 202. The display region 208 displays a hierarchical chart 250. The menu region 206 typically comprises various user-selectable controls for performing various operations (not shown in FIG. 2A) such as opening a file, copy and paste operations, etc. The operations may change depending on the specific application for which the GUI is displayed.

The display region 208 is used for displaying hierarchical information. For example, as depicted in FIG. 2A, display region 208 displays a hierarchical chart 250 comprising a plurality of nodes 211-214 and links connecting the nodes. Each node represents a concept or entity involved in the hierarchy depicted by chart 250. The links between the nodes represent hierarchical relationships between the concepts or entities represented by the nodes. For example, if chart 250 represents an organization personnel hierarchy, the nodes of hierarchical chart 250 may represent persons involved in the hierarchy and the links may represent hierarchical relationships between the personnel. For example, node 212 may represent a Director, nodes 211, 213, and 214 may represent managers under the Director. Each node may display information related to the entity or concept represented by the node. For example, the nodes in FIG. 2A may display names (e.g., Name 1, Name 2, etc.) corresponding to the people represented by the nodes. It is to be understood that other information items may be displayed as well.

As discussed above, each of the nodes represents an entity. Each entity has more than one set and/or category of information. For example, a personnel database may include different categories of information, such as a general category, a personal category, a contact information category, and an employment history category. Each of the categories is associated with a specific set of data for that entity. In various embodiments, when an entity is displayed as a node in a hierarchical chart, each category and/or set of information is displayed as a view of the node, and a node typically displays one view at a time.

In one embodiment, the display 200 has a default setting as to which view is to be display at a node. For example, at the default setting corresponding to view 1 (e.g., information "Set 1"), name and/or other information associated with each node is displayed.

In each of the nodes as displayed, a category/set selection menu is provided. For example, node 213 includes a selection menu 220 that is displayed on the node 213 itself.

Similarly, node 214 has a selection menu 218. The selection menus 218 and 220 (1) indicate which set of information (category of information) is being displayed and (2) provide an interface to allow users to change the information to be displayed on the particular node. For example, changing the selection at the selection menu 220 would individually change the category of information displayed for node 213.

The view control region 202 as shown includes a drop down menu, with which a user is able to select which set of information (or view) to use when displaying the hierarchical chart 250. For example, a user is able to select "Set 1" from the drop down menu to change the view for each node to correspond to "View 1," in which name, title, and telephone number are displayed at each node. It is to be understood that other types of view control may be used as well and are contemplated by the present invention. Depending on the application, the view may be adjusted in various ways, such as scrolling a scroll wheel of a mouse, keystrokes from a keyboard, etc.

When a different view is selected, the nodes in the hierarchical chart 210 display different sets of information. As an example, FIG. 2B shows the hierarchical chart 250 in which each of the nodes displays "View 2," which corresponds to the "Set 2" being selected at the view control region. For example, at "View," a second set of information (e.g., availability information) is displayed.

Now referring back to FIG. 2A. Each of the nodes as shown includes a view selection region. For example, the node 212 includes a view selection region 210. Each of the boxes at the view selection region corresponds to a view, and the selected view is indicated by the corresponding box being filled. For example, in FIG. 2A, the first box of the view selection region 210 is filled up, indicating that the first view is selected and the first set information is to be displayed. Similarly in FIG. 2B, the second box of the view selection region 210 is filled up, indicating that the second view is selected and the second set information is to be displayed.

In various embodiments, users are able to select the view by accessing either the view control region 202 or view selection regions of each node. For using the view control region 202 to select view, the selection made at the view control region 202 changes the view selection for every node when operating in a global mode. For example, the view control region 202 operates in global mode when all of the nodes or none of the nodes are selected. On the other hand, if one or more, but not all, of the nodes are selected, the view control region 202 only changes the view for the selected nodes.

A user may also select the view by accessing the selection regions of each node. As described above, each of the boxes at the view selection region corresponds to a view, and a user is able to change the view by selecting different boxes at the view selection region. When a user changes the view at a node, the view at other nodes is unaffected. The detailed descriptions are provided below.

Figure 3A:
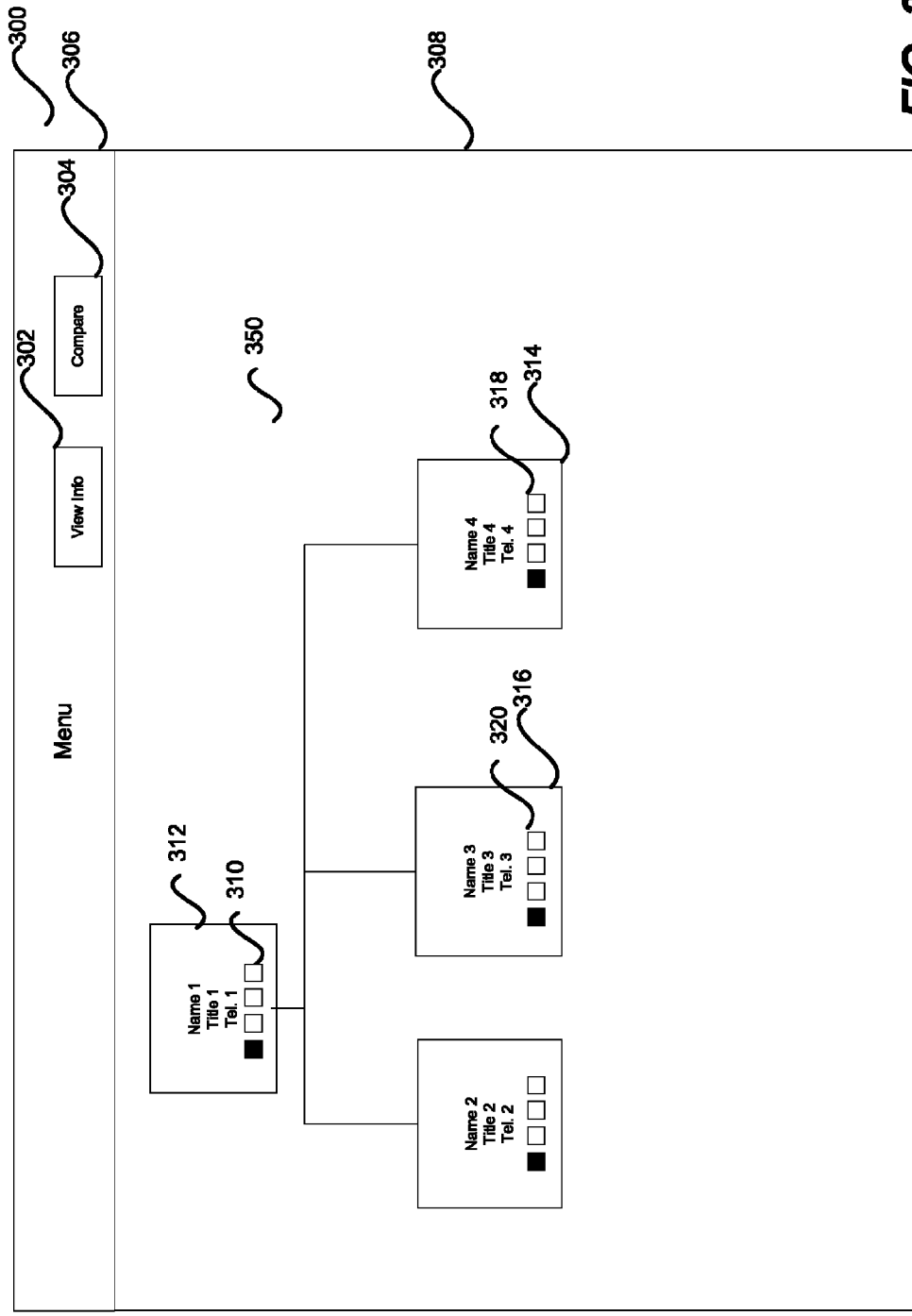
FIGS. 3A-3C are simplified diagrams illustrating changing views of selected nodes according to an embodiment of the present invention.
Figure 3B:
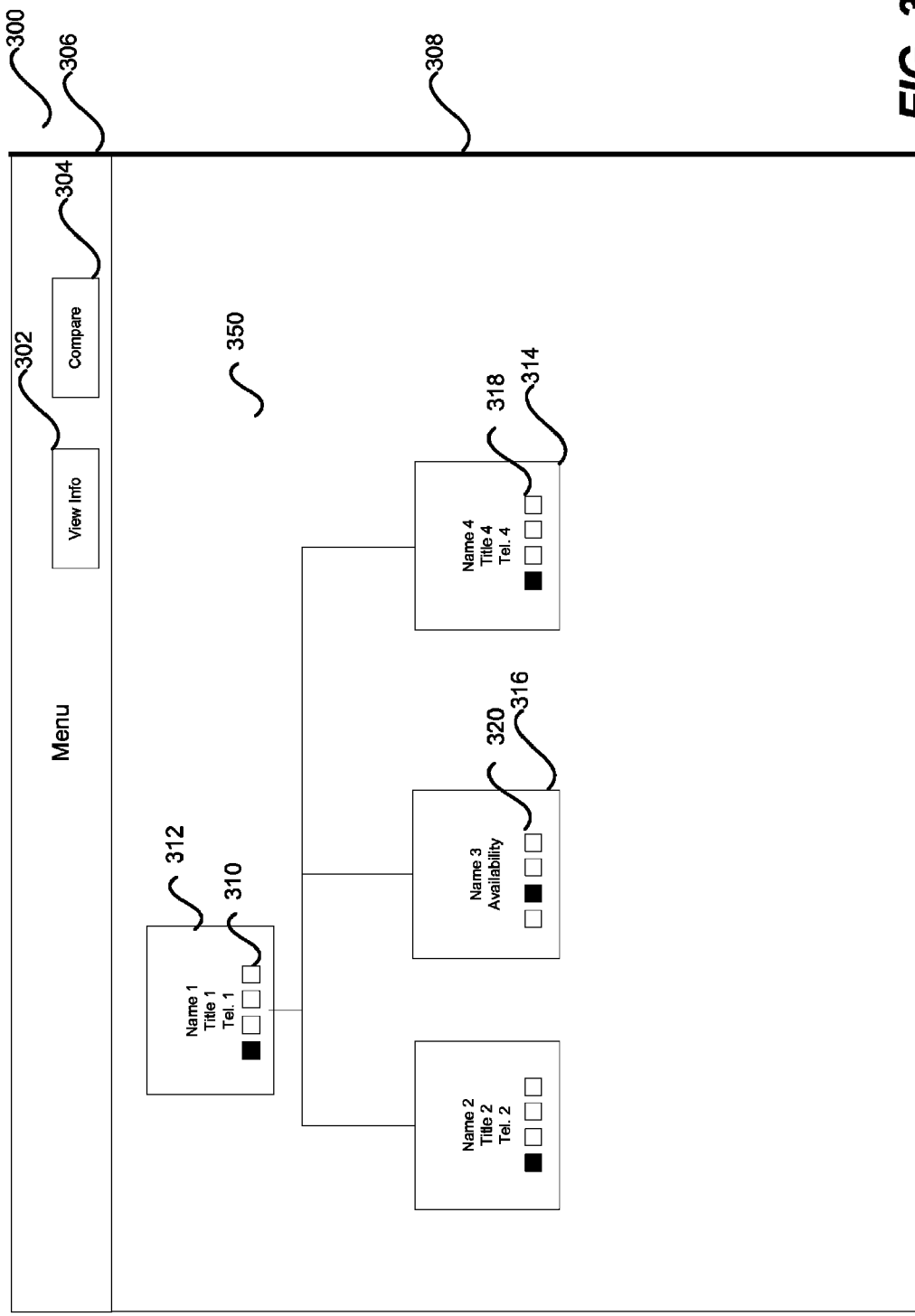
Figure 3C:
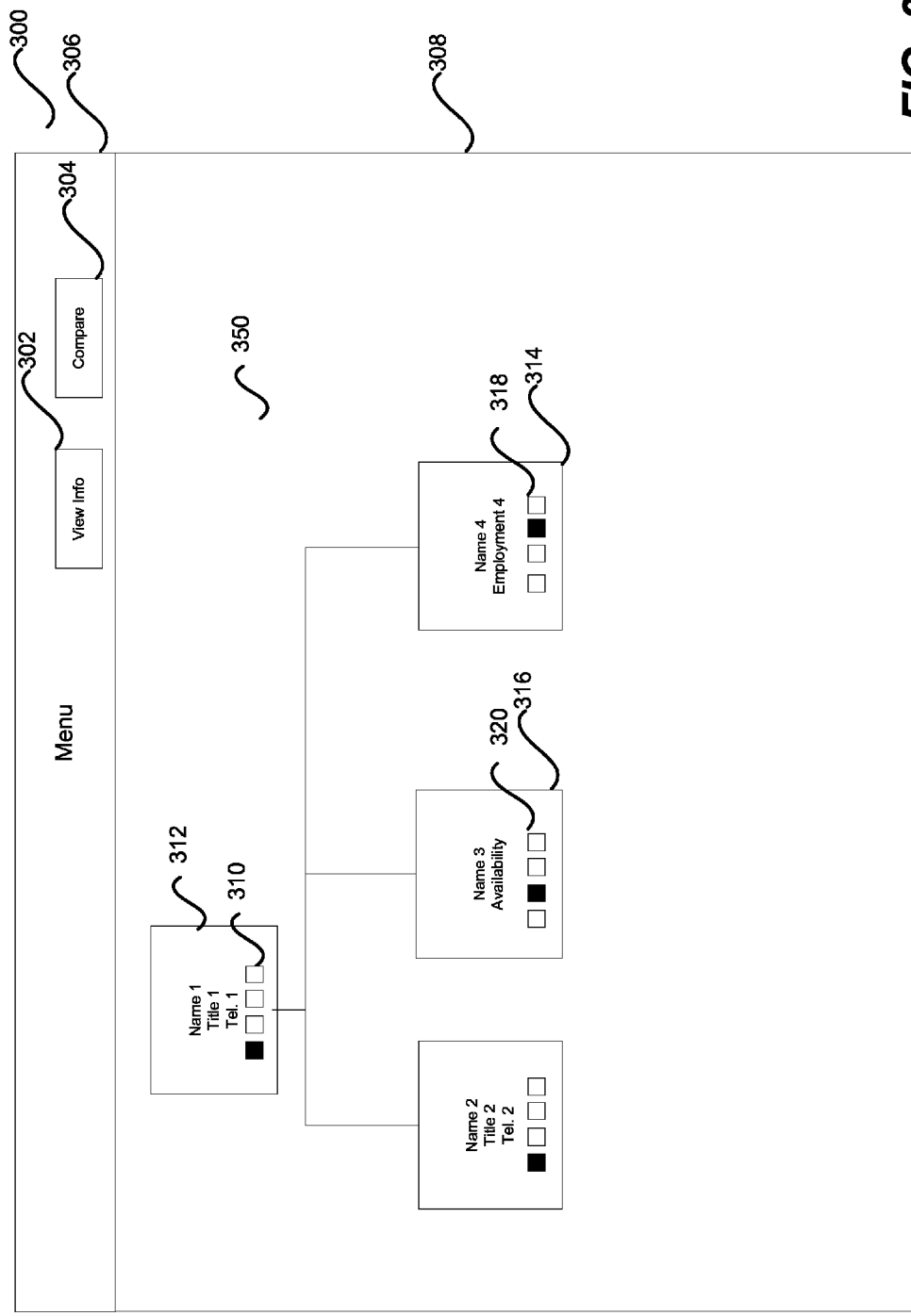

FIGS. 3A-3C are simplified diagrams illustrating changing views of selected nodes according to an embodiment of the present invention. These diagrams are merely examples, which should not unduly limit the scope of the claims. One of ordinary skill in the art would recognize many variations, alternatives, and modifications.

As shown in FIG. 3A, all of the nodes displayed inside the display region 308 of the hierarchical chart 350 are displaying the same set of information. That is, each of the nodes displays name, title, and telephone number for the entity represented by the node. As described above, each of the nodes includes a selection menu for selecting which set of information is to be displayed on an individual node. In FIG. 3A, each of the nodes is displaying the same set of information, and the first boxes of the selection menu are selected for each node. For example, nodes 310, 314, and 316 all have the first boxes of the selection menu checked. As a result, the same set of information (name, title, and telephone number) is displayed on each of the nodes.

When a user changes the selection at the node selection menu, the information displayed on that particular node is changed without affecting the information displayed on other nodes. In FIG. 3B, node 316 is shown to have selection menu 320 indicating that a different selection is made (the second box being checked). For example, the different selection is made by user input (e.g., a click of the mouse to check the second box at the selection menu 320). As a result of a different selection being made, the node 316 displays a different set of information, which includes name and availability, which is different from the information displayed on the other nodes (name, title, telephone). The change in the category and/or set of information being displayed on each node is individual. That is, a local change in selection menu for one node will not change the information displayed on the other nodes. It is to be appreciated that such ability to change the set of information displayed on an individual node(s) provides users with a better ability to customize the information display.

The change selection menu for information display is not limited to a single node. As shown in FIG. 3C, the node 316 displays a second set of information (name and availability) when the second box on the selection menu 316 is selected, whereas the node 314 displays a third set of information (name and employment) when the third box on the selection menu 318 is selected. The other nodes in FIG. 3C still display the first set of information (name, title, telephone).

Figure 4A:
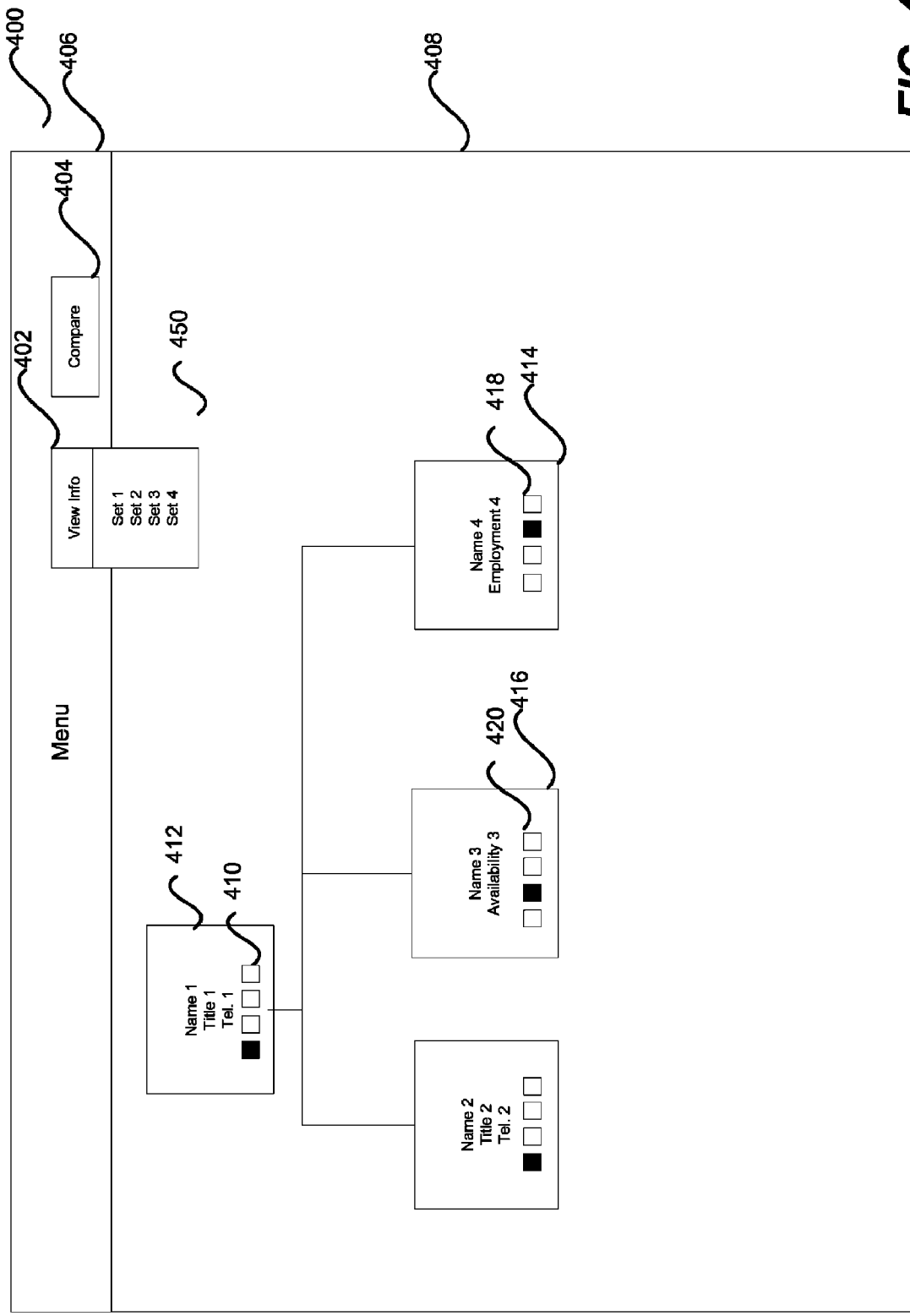
FIGS. 4A and 4B are simplified diagrams illustrating changing views of selected nodes using a global menu according to an embodiment of the present invention.
Figure 4B:
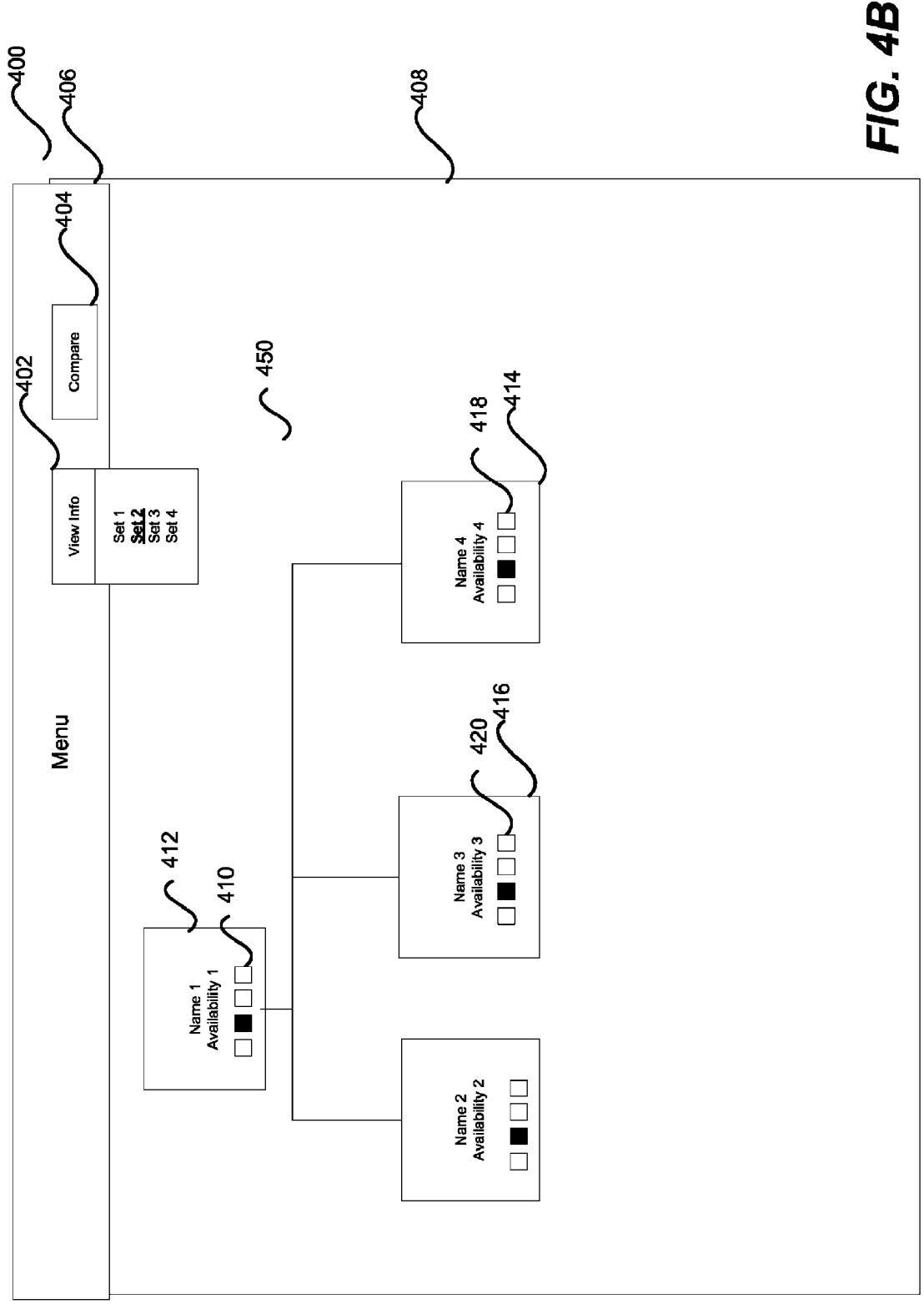

FIGS. 4A and 4B are simplified diagrams illustrating changing views of selected nodes using a global menu according to an embodiment of the present invention. These diagrams are merely examples, which should not unduly limit the scope of the claims. One of ordinary skill in the art would recognize many variations, alternatives, and modifications.

As shown in FIG. 4A, the nodes displayed on the hierarchical chart 450 display different sets of information. For example, node 412 displays name, title, and telephone; node 416 displays name and availability; node 414 displays name and employment. As explained above, different nodes display different sets of information because different sets of information are selected for display. At the selection menu 410 for node 412, the first box is checked, which means that the first set of information corresponding to the first box is displayed. Similarly, on the selection menu 420 for node 416, the second box is checked, which means that second set of information corresponding to the first box is displayed.

The selection of sets of information to be displayed for each of the nodes, as explained above, can be done either through a global selection or through individual selection menus. As shown in FIG. 4A, the menu region 406 has a view information menu 402 that allows users to select the set of information to be displayed. For example, the view information menu 402 includes 4 items (sets 1 through 4) for users to select. Upon selecting one or more of these items at the view information menu 402, all of the nodes of the hierarchical chart 450 are set to display the set of information selected at the view information menu 402.

As shown in FIG. 4B, "set 2" is selected at the view information menu 402, which is a global menu. As a result of this selection, all of the nodes as shown display the same set of information (name and availability) corresponding to the "set 2" selected at the view information menu 402. Additionally, the individual selection menus for each of the nodes are synchronized to indicate that the "set 2" is selected. For example, selection menus 410, 416, and 414 all show that the second boxes, which correspond to the "set 2," are selected.

It is to be understood that the view information menu 402 can also be used to change information displayed for only the selected nodes. For instance, if only nodes 412 and 414 are selected, a selection at the view information menu 402 would only change the information displayed at nodes 412 and 414.

Figure 5:
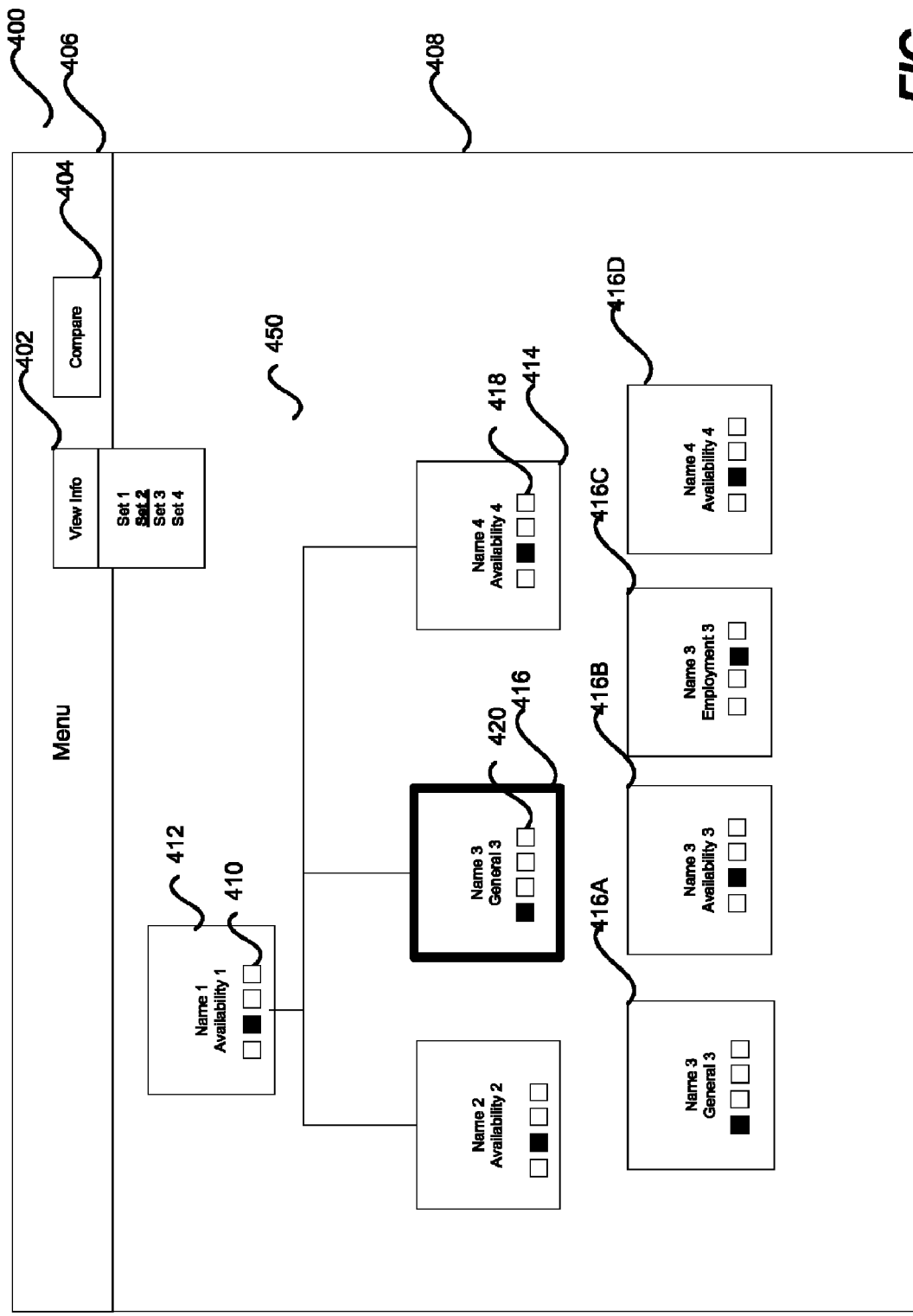
FIG. 5 is simplified diagram illustrating a node in an unstacked view according to an embodiment of the present invention.

FIG. 5 is simplified diagram illustrating a node in an unstacked view according to an embodiment of the present invention. This diagram is merely an example, which should not unduly limit the scope of the claims. One of ordinary skill in the art would recognize many variations, alternatives, and modifications. As shown in FIG. 5, the node 416, which is a part of the hierarchical chart 450, is selected for displaying in an unstacked mode. In this mode, all sets of information (sets 1-4) are displayed as view cards 416A-416D. The view cards 416A-D are not linked to any of the nodes of the hierarchical chart 450, as they display sets of information associated with the node 416. In addition to the sets of information they represent, each of the view cards 416A-D includes an indicator as which set of information is displayed. For example, view card 416A displays name and general information that corresponds to the first checked box, where the view card 416B displays name and availability that corresponds to the second checked box.

The node 416, when being displayed in the unstacked mode as shown in FIG. 5, is highlighted (bold border compared to thin border of other nodes) to indicate that the node 416 is in the unstacked mode. Depending on the application, there can be other variations as well.

Figure 6:
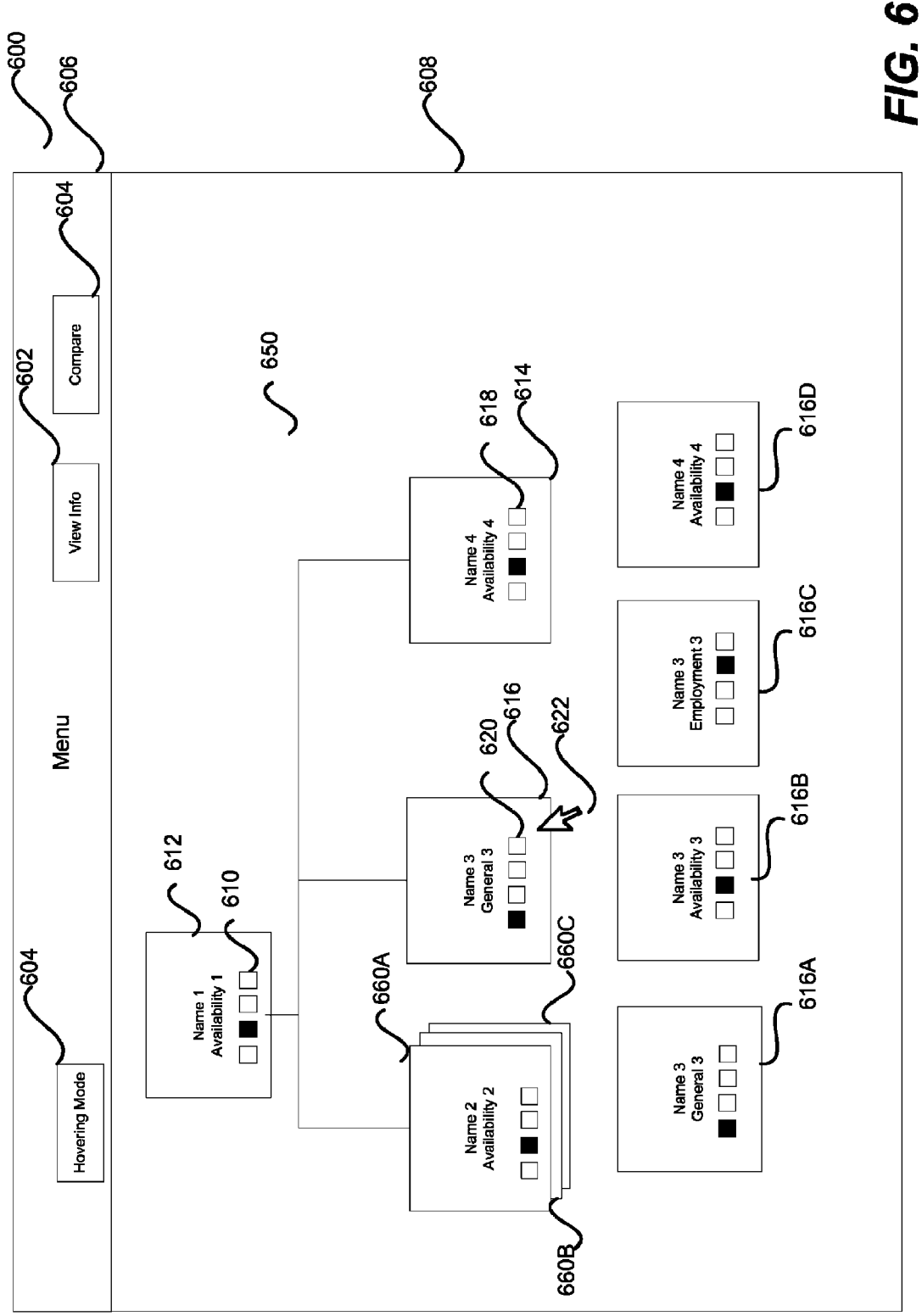
FIG. 6 is simplified diagram illustrating a node displayed in a hovering mode according to an embodiment of the present invention.

The unstacked mode may be entered into in various ways. In one embodiment, a node is unstacked when a cursor hovers over that node. FIG. 6 is simplified diagram illustrating a node displayed in a hovering mode according to an embodiment of the present invention. As shown in FIG. 6, a cursor 622 hovers over node 616. As a result, view cards 616A-D corresponding to different sets of information of node 616 are displayed. In an embodiment, the hovering mode is enabled upon selecting a global hovering mode button 604. For example, when the cursor 622 hovers over other nodes, an unstacked view of those nodes is also displayed.

Figure 7:
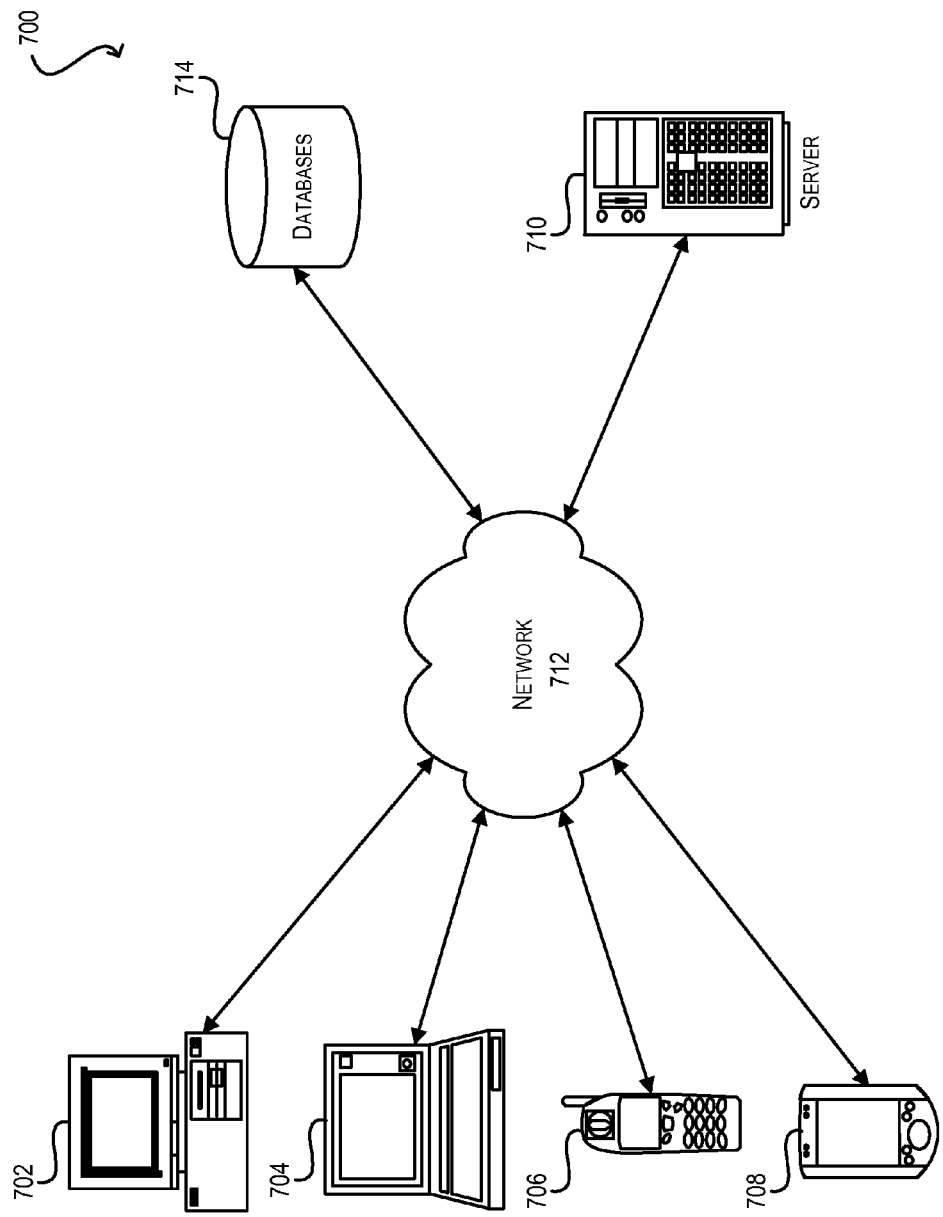
FIG. 7 is a simplified block diagram illustrating the physical components of a system environment 700 that may be used in accordance with an embodiment of the present invention.

It is to be appreciated that the graphical user interface can be implemented with various types of hardware systems. FIG. 7 is a simplified block diagram illustrating physical components of a system environment 700 that may be used in accordance with an embodiment of the present invention. This diagram is merely an example, which should not unduly limit the scope of the claims. One of ordinary skill in the art would recognize many variations, alternatives, and modifications.

As shown, system environment 700 includes one or more client computing devices 702, 704, 706, 708 communicatively coupled with a server computer 710 via a network 712. In one set of embodiments, client computing devices 702, 704, 706, 708 may be configured to run one or more components of a graphical interface described above.

Client computing devices 702, 704, 706, 708 may be general purpose personal computers (including, for example, personal computers and/or laptop computers running various versions of Microsoft Windows™ and/or Apple Macintosh™ operating systems), cell phones or PDAs (running software such as Microsoft Windows Mobile™ and being Internet, e-mail, SMS, Blackberry™, and/or other communication protocol enabled), and/or workstation computers running any of a variety of commercially-available UNIX™ or UNIX™-like operating systems (including without limitation the variety of GNU/Linux™ operating systems). Alternatively, client computing devices 702, 704, 706, and 708 may be any other electronic device capable of communicating over a network (e.g., network 712 described below) with server computer 710. Although system environment 700 is shown with four client computing devices and one server computer, any number of client computing devices and server computers may be supported.

Server computer 710 may be a general purpose computer, specialized server computer (including, e.g., a LINUX™ server, UNIX™ server, mid-range server, mainframe computer, rack-mounted server, etc.), server farm, server cluster, or any other appropriate arrangement and/or combination. Server computer 710 may run an operating system including any of those discussed above, as well as any commercially available server operating system. Server computer 710 may also run any of a variety of server applications and/or mid-tier applications, including web servers, Java™ virtual machines, application servers, database servers, and the like. In various embodiments, server computer 710 is adapted to run one or more Web services or software applications described in the foregoing disclosure. For example, server computer 710 may provide the abovementioned graphical user interface and functionalities thereof.

As shown, client computing devices 702, 704, 706, 708 and server computer 710 are communicatively coupled via network 712. Network 712 may be any type of network that can support data communications using any of a variety of commercially-available protocols, including without limitation TCP/IP, SNA, IPX, AppleTalk™, and the like. Merely by way of example, network 712 may be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth™ protocol known in the art, and/or any other wireless protocol); and/or any combination of these and/or other networks. In various embodiments, the client computing devices 702, 704, 706, 708 and server computer 710 are able to access the database 714 through the network 712. In certain embodiments, the client computing devices 702, 704, 706, 708 and server computer 710 each has its own database.

System environment 700 may also include one or more databases 714. Database 714 may correspond to an instance of integration repository as well as any other type of database or data storage component described in this disclosure. Database 714 may reside in a variety of locations. By way of example, database 714 may reside on a storage medium local to (and/or resident in) one or more of the computing devices 702, 704, 706, 708, 710. Alternatively, database 714 may be remote from any or all of the computing devices 702, 704, 706, 708, 710 and/or in communication (e.g., via network 712) with one or more of these. In one set of embodiments, database 714 may reside in a storage-area network (SAN) familiar to those skilled in the art. Similarly, any necessary files for performing the functions attributed to the computing devices 702, 704, 706, 708, 710 may be stored locally on the respective computer and/or remotely on database 714, as appropriate. In one set of embodiments, database 714 is a relational database, such as Oracle 10g available from Oracle Corporation that is adapted to store, update, and retrieve data in response to SQL-formatted commands. In various embodiments, the database 714 stores data that is displayed as hierarchical charts shown in FIGS. 2A-6.

Figure 8:
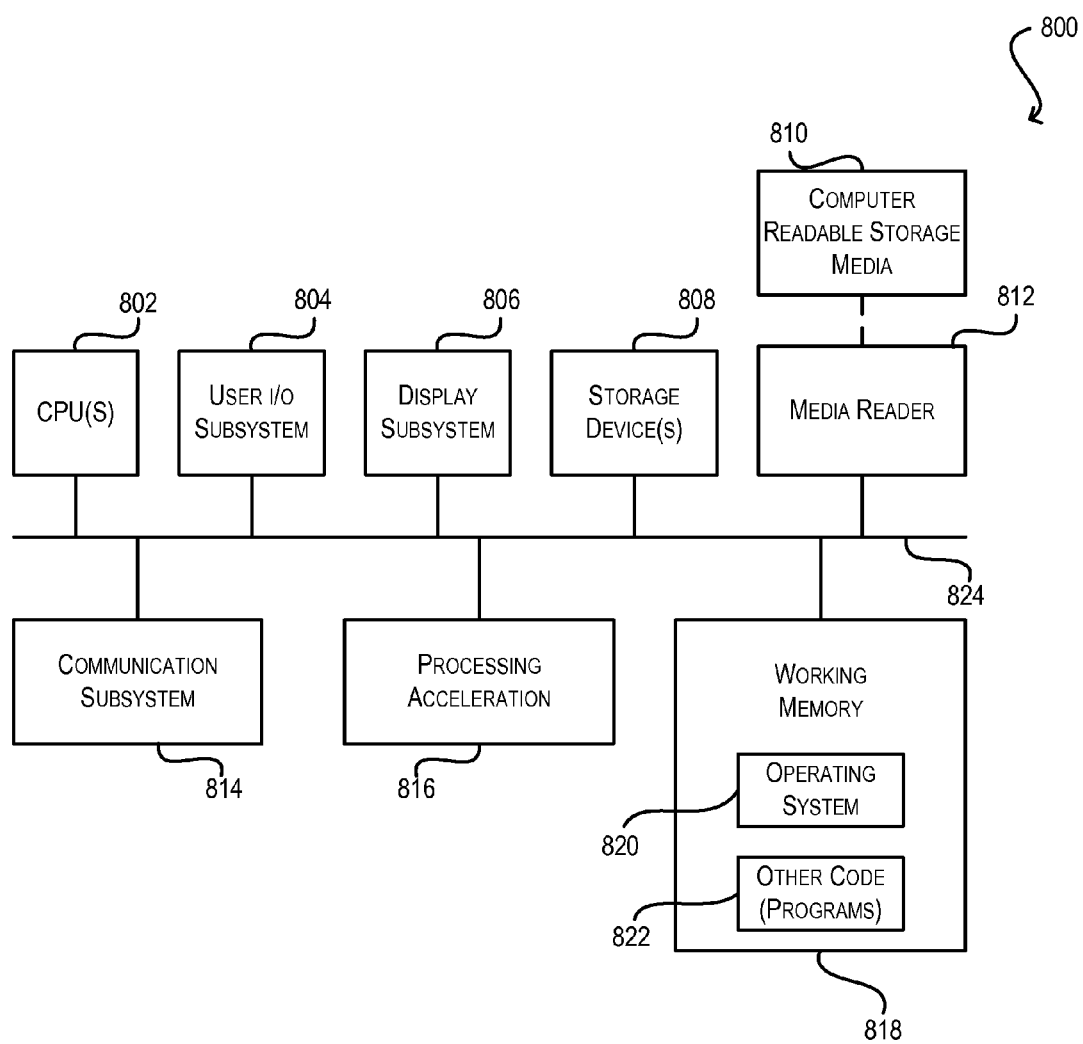
FIG. 8 is a simplified block diagram illustrating the physical components of a computer system 800 that may be used in accordance with an embodiment of the present invention.

FIG. 8 is a simplified block diagram illustrating physical components of a computer system 800 that may be used in accordance with an embodiment of the present invention. This diagram is merely an example, which should not unduly limit the scope of the claims. One of ordinary skill in the art would recognize many variations, alternatives, and modifications.

In various embodiments, computer system 800 may be used to implement any of the computing devices 702, 704, 706, 708, 710 illustrated in system environment 700 described above. As shown in FIG. 8, computer system 800 comprises hardware elements that may be electrically coupled via a bus 824. The hardware elements may include one or more central processing units ("CPUs") 802, one or more input devices 804 (e.g., a mouse, a keyboard, etc.), and one or more output devices 806 (e.g., a display device, a printer, etc.). For example, the input devices 804 are used to receive user input for interacting with the GUI(s) illustrated in FIGS. 2A-5. Computer system 800 may also include one or more storage devices 808. By way of example, storage device(s) 808 may include devices such as disk drives, optical storage devices, and solid-state storage devices such as a random access memory (RAM) and/or a read-only memory (ROM), which can be programmable, flash-updateable and/or the like. In an embodiment, various databases are stored in the storage devices 808. For example, the central processing unit 802 is configured to retrieve data from database process the data for displaying on a GUI.

Computer system 800 may additionally include a computer readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor ("DSP"), a special-purpose processor, and/or the like.

Computer readable storage media reader 812 can further be connected to a computer readable storage medium 810, together (and, optionally, in combination with storage device(s) 808) comprehensively representing remote, local, fixed, and/or removable storage devices plus storage media for temporarily and/or more permanently containing computer readable information. Communications system 814 may permit data to be exchanged with network 712 of FIG. 7 and/or any other computer described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). In a particular embodiment, working memory 818 may include executable code and associated data structures for one or more of the design-time or runtime components/services illustrated in FIGS. 2A through 4B. It should be appreciated that alternative embodiments of computer system 800 may have numerous variations from that described above. For example, customized hardware might also be used and/or particular elements might be implemented in hardware, software (including portable software, such as Applets™), or both. Further, connection to other computing devices such as network input/output devices may be employed. In various embodiments, the behavior of the zoom functions described throughout the present application is implemented as software elements of the computer system 800.

In one set of embodiments, the techniques described herein may be implemented as program code executable by a computer system (such as a computer system 800) and may be stored on machine-readable media. Machine-readable media may include any appropriate media known or used in the art, including storage media and communication media, such as (but not limited to) volatile and non-volatile, removable and non-removable media implemented in any method or technology for storage and/or transmission of information such as machine-readable instructions, data structures, program modules, or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices, or any other medium which can be used to store or transmit the desired information and which can be accessed by a computer.

Figure 9:
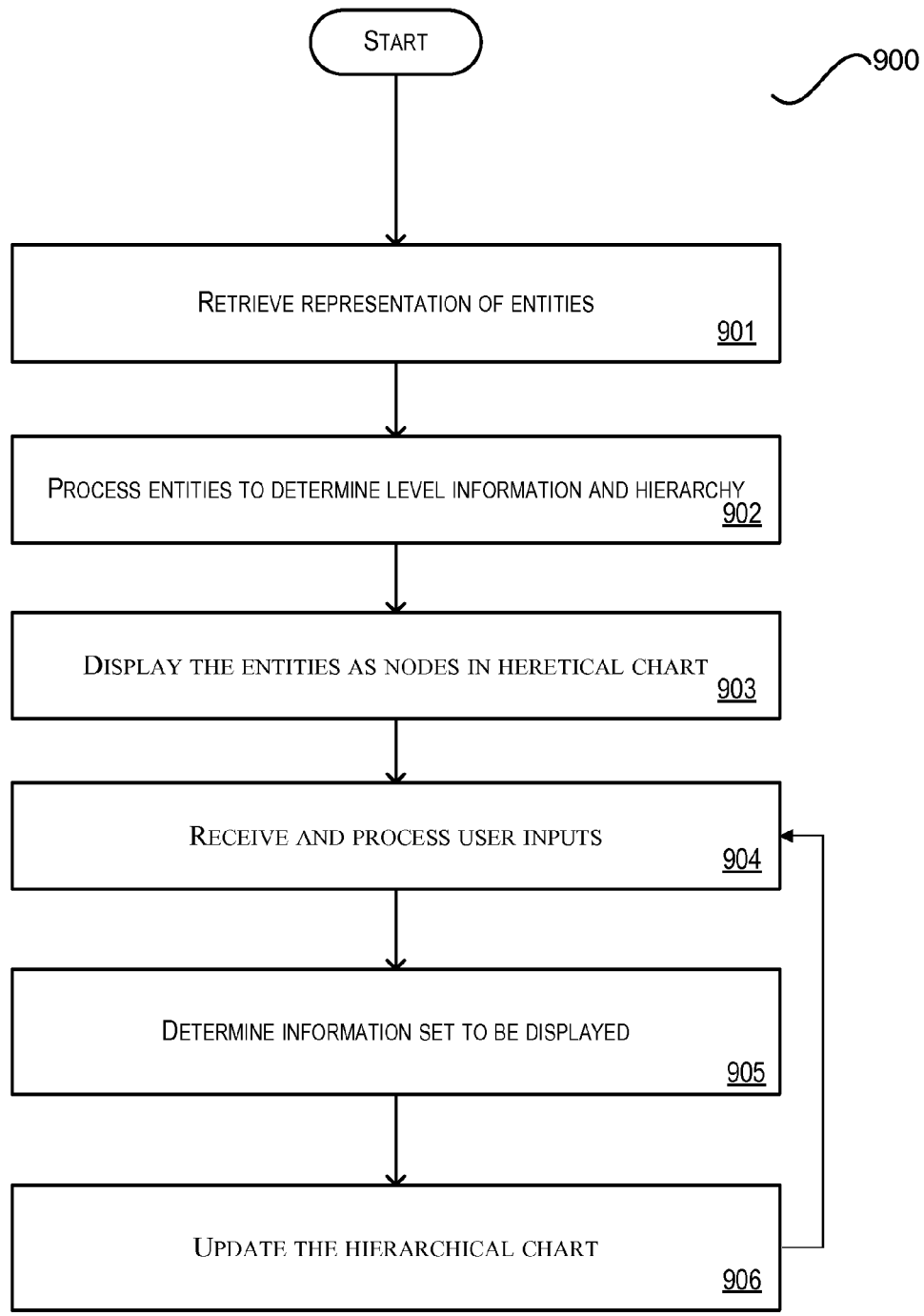
FIG. 9 is a simplified flow diagram illustrating the operation of a graphical user interface according to embodiments of the present invention.

In an embodiment, the systems illustrated in FIGS. 7 and 8 are configured to perform a process shown in FIG. 9. FIG. 9 is a simplified flow diagram illustrating operation of graphical user interface according to embodiments of the present invention. This diagram is merely an example, which should not unduly limit the scope of the claims. One of ordinary skill in the art would recognize many variations, alternatives, and modifications. For example, various steps may be added, removed, replaced, modified, replaced, repeated, and/or overlapped.

As shown in FIG. 9, the process 900 starts with step 901, in which information representing a plurality of entities is retrieved. For example, the information includes both different sets of information that are particular to the entities and the relationship data of the these entities. At step 902, the information is processed so the hierarchical relationship among the entities are determined. At step 903, a hierarchical chart is displayed to represent the entities. For example, each of the entities is represented as a node of the hierarchical chart. Depending on the application, a default set of information may be displayed for each of the nodes. At step 904, user input is received. For example, the user input indicates that the information displayed for the nodes needs to be changed. In step 905, the process determines which set of information is to be displayed for which nodes. For example, if a user select only a single node for changing the set of information to be displayed, only that specific nodes is to change information for display. On the other hand, as discussed above, if a global selection is made to change information to be displayed, all (or multiple selected) nodes need to update the information that is displayed. At step 906, the information displayed is updated on the display. After the information has been updated, the process continues to receive user input and update the node information display if needed.

Although specific embodiments of the present invention have been described, various modifications, alterations, alternative constructions, and equivalents are within the scope of the invention. Further, while embodiments of the present invention have been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. In a computer system having a processor, a graphical user interface including a display and a user interface device communicatively coupled to the processor, the processor being configured to execute code stored in a computer-readable medium for operating the user interface device, the computer-readable medium comprises:

code for obtaining information representing a plurality of entities and relationship data associated with the plurality of entities, the plurality of entities and the relationship data associated with the plurality of entities being stored in a memory, each of the plurality of entities including data being associated with a plurality of categories, the plurality of categories including a first category and a second category, the plurality of entities including a first entity and a second entity, the first entity including a first data set associated with the first category and a second data set associated with the second category, the second entity including a third data set associated with the first category and a fourth data set associated with the second category;

code for defining a menu region and a display region within the graphical user interface, the menu region including a global selection menu, the global selection menu including selections for the first category and the second category;

code for displaying the plurality of entities within the display region, the plurality of entities being displayed as nodes of a hierarchical chart based on at least the relationship data, each of the nodes displaying a default data set, each of nodes including a selection menu, the first entity including a first selection menu, the second entity including a second selection menu;

code for receiving a first user input by the user interface device;

code for processing the first user input;

code for updating data displayed on one or more nodes based on the user input;

wherein:
  each of the plurality of nodes displays information associated with the first category if the first category is selected at the global selection menu;
  if the first category from the first selection menu is selected, a first node corresponding to the first entity displays information from the first data set and information displayed at a second node corresponding to the second entity is unaffected by the user input.

2. The computer-readable medium of claim 1 further comprising:
  code for receiving a second user input selecting the second category from the first selection menu;
  code for updating the first node to display information associated with the second data set.

3. The computer-readable medium of claim 2 further comprising:
  code for receiving a third user input selecting the first category from the second selection menu;
  code for updating the second node to display information associated with the third data set;
  wherein the first node displays information associated with the second data set.

4. The computer-readable medium of claim 3 further comprising:
  code for receiving a fourth user input selecting the first category at the global selection menu;
  code for updating each of the nodes to display information associated with the first category.

5. The computer-readable medium of claim 1 further comprising:
  code for processing information from the entities;
  code for generating category information for the entities.

6. The computer-readable medium of claim 1 further comprising code for storing a category state for each of the nodes.

7. A system for providing graphical user interface, the system comprising:
  a processor for obtaining information for a plurality of entities from a memory, relationship data associated with the plurality of entities being stored in the memory, each of the plurality of entities including data being associated with a plurality of categories, the plurality of categories including a first category and a second category, the plurality of entities including a first entity and a second entity, the first entity including a first data set associated with the first category and a second data set associated with the second category, the second entity including a third data set associated with the first category and a fourth data set associated with the second category;
  a user input device for receiving one or more user inputs;
  a display for displaying a menu region and a display region within the graphical user interface, the menu region including a global selection menu, the global selection menu including selections for the first category and the second category, the display configured for displaying the plurality of entities within the display region, the plurality of entities being displayed as nodes of a hierarchical chart based on at least the relationship data, each of the nodes displaying a default data set, each of the nodes including a selection menu, the first entity including a first selection menu, the second entity including a second selection menu;
  a memory for storing category states for each of the nodes;
  wherein:
    each of the plurality of nodes displays information associated with the first category if the first category is selected at the global selection menu;
    if the first category from the first selection menu is selected, a first node corresponding to the first entity displays information from the first data set and information displayed at a second node corresponding to the second entity is unaffected by the user input.

8. The system of claim 7 wherein each of the nodes comprises a category selection region.

9. The system of claim 7 wherein each of the nodes is displayed as a stack of views, each of the views being associated with a set of data of an entity.

10. The system of claim 7 wherein the user input devices comprise a mouse and a keyboard.

11. The system of claim 7 further comprising a network interface, the processor being configured to obtain information from the network interface.

12. The system of claim 7 wherein the memory comprises a hard drive.

13. A computer-readable medium for providing a graphical user interface, the computer-readable medium having code executable by a processor, the computer-readable medium comprising:
  code for obtaining information for a plurality of entities and relationship data associated with the plurality of entities, the information for the plurality of entities and the relationship data associated with the plurality of entities being stored in a memory, each of the plurality of entities including data being associated with a plurality of categories, the plurality of categories including a first category and a second category, the plurality of entities including a first entity and a second entity, the first entity including a first data set associated with the first category and a second data set associated with the second category, the second entity including a third data set associated with the first category and a fourth data set associated with the second category;

code for defining a menu region and a display region within the graphical user interface, the menu region including a global selection menu, the global selection menu including selections for the first category and the second category;

code for displaying the plurality of entities within the display region, the plurality of entities being displayed as nodes of a hierarchical chart based on at least the relationship data, each of the nodes displaying a default data set, each of nodes including a selection menu, the first entity including a first selection menu, the second entity including a second selection menu;

code for processing a first user input by the user interface device;

code for updating data displayed on one or more nodes based on the user input;

code for causing each of the plurality of nodes to display information associated with the first category if the first category is selected at the global selection menu;

code for causing the first node to display information associated with the second data set, if a first node is selected to display information associated with the second category, while a third node displays information associated with the third data set, the first node corresponding to the first entity.

14. The computer-readable medium of claim 13 further comprising code for displaying a view selection menu for each node.

15. The computer-readable medium of claim 13 further comprising code for determining a hierarchical relationship among the nodes.

16. The computer-readable medium of claim 13 further comprising code for all categories of information associated with a first node of the hierarchical chart upon receiving a second user input, the display region showing a hierarchical relationship between the first node and the other nodes.

17. The computer-readable medium of claim 13 further comprising code for displaying a first node, the first node corresponding to a first entity, the first node including a stack of selectable views, each of the selectable views corresponding to a set of data of the first entity.

18. The computer-readable medium of claim 13 further comprising code for processing information from the memory to determine category information.

19. The computer-readable medium of claim 13 further comprising code for associating data sets of the entities with a plurality of categories.

20. The computer-readable medium of claim 13 further comprising code for rendering links among nodes based on the relationship data.

* * * * *

UNITED STATES PATENT AND TRADEMARK OFFICE
CERTIFICATE OF CORRECTION

PATENT NO.        : 8,205,171 B2                                            Page 1 of 1
APPLICATION NO.   : 12/563071
DATED             : June 19, 2012
INVENTOR(S)       : Chen et al.

It is certified that error appears in the above-identified patent and that said Letters Patent is hereby corrected as shown below:

On Title Page, item (75); in column 1, under "Inventors", line 2, delete "Ulysal," and insert
-- Uysal, --, therefor.

On Title Page, in column 2, under "Primary Examiner", line 1, delete "Tadeese" and insert
-- Tadesse --, therefor.

In column 6, line 57-63, delete "Similarly, node 214 has a selection menu 218. The selection menus 218 and 220 (1) indicate which set of information (category of information) is being displayed and (2) provide an interface to allow users to change the information to be displayed on the particular node. For example, changing the selection at the selection menu 220 would individually change the category of information displayed for node 213." and insert the same on Col. 6, Line 56, after "213 itself." as a continuation of the Paragraph.

Signed and Sealed this
Fourth Day of September, 2012

David J. Kappos
*Director of the United States Patent and Trademark Office*